(12) United States Patent
Battello et al.

(10) Patent No.: US 8,214,477 B2
(45) Date of Patent: Jul. 3, 2012

(54) METHOD AND APPARATUS FOR DYNAMIC ASSIGNMENT OF SETS OF ADDRESSES

(75) Inventors: Fabien Battello, Bégard (FR); Yves L'azou, Trebeurden (FR)

(73) Assignee: France Telecom, Paris (FR)

( * ) Notice: Subject to any disclaimer, the term of this patent is extended or adjusted under 35 U.S.C. 154(b) by 122 days.

(21) Appl. No.: 12/159,529

(22) PCT Filed: Nov. 27, 2006

(86) PCT No.: PCT/EP2006/068963
§ 371 (c)(1),
(2), (4) Date: Oct. 1, 2008

(87) PCT Pub. No.: WO2007/074006
PCT Pub. Date: Jul. 5, 2007

(65) Prior Publication Data
US 2009/0037603 A1 Feb. 5, 2009

(30) Foreign Application Priority Data
Dec. 29, 2005 (FR) ..................................... 05 13475

(51) Int. Cl.
*G06F 15/16* (2006.01)
(52) U.S. Cl. ......................... 709/223; 709/226; 709/245
(58) Field of Classification Search .................. 709/245, 709/223, 226; 370/389
See application file for complete search history.

(56) References Cited

U.S. PATENT DOCUMENTS

| 6,880,000 | B1 | | 4/2005 | Tominaga et al. | ............ | 709/220 |
|---|---|---|---|---|---|---|
| 7,197,549 | B1 | * | 3/2007 | Salama et al. | ................. | 709/223 |
| 7,587,493 | B1 | * | 9/2009 | Sheth | ............................. | 709/226 |
| 2005/0097223 | A1 | * | 5/2005 | Shen et al. | ..................... | 709/245 |
| 2005/0204162 | A1 | * | 9/2005 | Rayes et al. | ................... | 713/201 |
| 2006/0126636 | A1 | * | 6/2006 | Dooley et al. | ............... | 370/395.3 |
| 2008/0101353 | A1 | * | 5/2008 | Streijl et al. | ................... | 370/389 |

OTHER PUBLICATIONS

Shen et al., Redback Networks; Tom Soon, SBC Communications; Dae-Cheol Roh, Korea Telecom: "DHCP Proxy Server Micro-block Allocation Scheme for IP Address Pool Management," Feb. 2004.
Mcauley A.J. et al., "Self-configuring networks," Oct. 22, 2000.
International Search Report from counterpart foreign Application No. PCT/EP2006/068963.
International Preliminary Report on Patentability from counterpart foreign Application No. PCT/EP2006/068963.
French Search Report from counterpart foreign Application No. 05/13475.

* cited by examiner

*Primary Examiner* — Djenane Bayard
(74) *Attorney, Agent, or Firm* — David D. Brush; Westman, Champlin & Kelly, P.A.

(57) ABSTRACT

A method is provided of dynamically allocating an IP address, via a DHCP relay, to a client terminal within a communication network. The DHCP relay is able to choose the IP address within at least one first set of IP addresses that is administered by an entity for managing sets of IP addresses. The method implements: a first step of transmitting, to the entity for managing sets of IP addresses, a request to allocate an IP address to the client terminal; a second step in which the entity for managing sets of IP addresses selects a set of IP addresses within which to choose the IP address to be allocated from among: either the at least one first set of IP addresses; or at least one second set of IP addresses that is newly created as a function of at least one predetermined parameter; and a third step of allocating in respect of the client terminal at least one IP address chosen by the DHCP relay in the selected set of IP addresses.

10 Claims, 4 Drawing Sheets

METHOD AND APPARATUS FOR DYNAMIC ASSIGNMENT OF SETS OF ADDRESSES

CROSS-REFERENCE TO RELATED APPLICATIONS

This Application is a Section 371 National Stage Application of International Application No. PCT/EP2006/068963, filed Nov. 27, 2006 and published as WO 2007/074006A1 on Jul. 5, 2007, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the assigning of sets of addresses (or pools of addresses) from the network level to devices of the network.

More specifically, the disclosure relates to the dynamic assigning of pools of IP addresses using the DHCP (Dynamic Host Configuration Protocol).

The DHCP is used mainly to distribute IP (Internet Protocol) addresses to apparatuses forming a network. A DHCP pool is used to give the client an IP address chosen from a range of addresses (or IP subnets) so that this client can log in to the different servers of the network to which he is linked. Obtaining an IP address enables the customer for example to receive electronic mail by through a mail reception software program.

Here below in the document, the terms "pool" or "set" will be used without distinction to designate sets of IP addresses.

BACKGROUND OF THE DISCLOSURE

DHCP Relays

Referring now to FIG. 1, we present the principle of operation of a DHCP relay within an operator's communications network.

Telecommunications operators use the DHCP protocol to assign IP addresses to the terminal apparatuses of their customers and/or to the modem-router in order to establish connectivity with their network and thus provide certain services (Internet access, videoconferences, voice-on-IP, digital television, video on request, etc).

The DHCP relay 10, as defined in the document RFC2131 (document describing the DHCP by the IETF or Internet Engineering Task Force which is the protocol standardization organization in the Internet world), plays a role in DHCP messages broadcast by Ethernet. The main goal of this relay is to extend the range of action of the broadcast DHCP messages beyond the client's local area network (LAN) 100. Thus, through the DHCP relay 10, the client (using apparatuses forming his network, 101, 102, 103, 104) can send out general broadcast messages, the DHCP relay 10 acting to link up the client's local area network with the operator's network 101.

The chief use of a DHCP relay 10 therefore is to set up a gateway/router from the client's LAN 100 relaying the DHCP messages sent out on this local network to a second LAN 101 (that of the telecommunications operator) in which the DHCP server is situated, thus enabling physical separation between the client, operator network and ISP (Internet Service Provider) networks.

The DHCP relay 10 is therefore an apparatus forming part of the operator's administrative domain. It is situated on the boundary of the network 101 (as in the case of the DSLAM or Digital Subscriber Line Access Multiplexer) or right within the network 101 (as in the case of a BRAS or Broadband Remote Access Server or router when the client's circuit is extended or permutated up to this apparatus).

The function of a DHCP relay is very widely used by operators to relay DHCP messages from the clients LAN (which has the apparatuses 101, 102, 103, 104) to one or more DHCP servers 1011, 1012 situated in the operator's network.

It is a physical element of the operator's network, that acts as a DHCP relay 10. In general, it is the IP node (the router) closest to the client which has this relaying responsibility (as in the case for example of the DSLAM collecting client traffic).

The client's local area network (through the modem) can be attached to the DHCP relay by means of a physical interface sub-divided into logic sub-interfaces such as VCs (virtual channels), ATM (Asynchronous Transfer Mode) interfaces or VLANs (Virtual Local Area Networks).

In the network element in which the DHCP relay function is implanted, it is in the IP configuration of each logic sub-interface (1001, 1002, 1003, 1004) that the link is set up with a DHCP address pool which will be used to serve the client in the context of this sub-interface. In other words, each logic sub-interface (1001, 1002, 1003, 1004) assigned to the client's local area network in the DHCP relay 10 has an IP address that serves as a link with the IP addresses assigned in the local area network 100, these addresses being assigned to the modem or to the apparatuses 101, 102, 103, 104. Thus, a client having a local area network in which four services are launched (through four apparatuses 101, 102, 103, 104) corresponding to four logic sub-interfaces (1001, 1002, 1003, 1004) will have four IP addresses available assigned by means of the DHCP protocol.

Pool Selector

Several pools can be declared in the DHCP server. They enable the addressing of different services (Internet access, videoconferencing, voice-on-IP, digital television, video on request, etc) calling for distinct IP addressing planes. The DHCP server acts as a pool selector for the assigning of IP addresses.

As a rule, the DHCP relay apparatus gives the DHCP server an indication of the pool to be selected by means of the "giaddr" DHCP field of the DHCP request. This field identifies the address of the gateway. The "giaddr" field is updated by the DHCP relay upon an IP address assignment query sent by an apparatus of the client's local area network. The apparatus relays the query to the DHCP server in entering information into the giaddr field which subsequently acts as a pool selection indicator with the DHCP server (as described in the standardization document RFC2131).

The DHCP server then determines the pool in which it will serve the client. This selection can be done according to several criteria. However, the first criterion taken into account by the pool selector (the DHCP server) is generally the "giaddr".

According to the strategy, the DHCP server can choose any unoccupied address in the pool (the first unoccupied address for example) or use additional criteria such as the MAC address (machine address) or the client line identifier to restrict the choice to a range of addresses or to precisely one address.

It can be seen therefore that the "giaddr" field plays a dual role:
- a role of IP connectivity between the DHCP relay and DHCP server. Indeed, the "giaddr" address should be "routable" on the IP network because the DHCP server responds to the DHCP relay located at the giaddr IP address.
- a pool selection role. The "giaddr" and the pool belong to the same IP sub-network or subnet; it is thus that the DHCP server recognizes the pool indicated and selects it.

The IETF (Internet Engineering Task Force) has also defined possibilities of indicating the pool, by creating new indicators positioned by the client ("Subnet Selection Option" as set forth in the RFC3011) or by the relay (Link Selection Option under the RFC3527). In these modes of operation, the "giaddr" field loses its pool indicator role.

It can therefore been seen that the link between the IP configuration of an interface and the DHCP pool that would be used to serve the client is set up mainly by the "giaddr".

Drawbacks of the Prior Art

A major drawback of this prior art technique is that the IP configuration of each interface is statically linked to the pool. It may be recalled that an interface of the client's local area network is linked to one or more services (Internet access, videoconferencing, voice-on-IP, digital television, video on demand, etc). Consequently, the configuration of each service is linked to the pool. Indeed, each interface is statically attached by configuration to a "giaddr" value and is therefore statically attached to a particular pool since this it is the value of "giaddr" that is used by the DHCP server to select the pool in which it will serve the client.

A corollary drawback of this prior art technique is that the address pools are assigned statically, giving rise to substantial over-consumption of IP addresses. This is a problem when the addresses are IPv4 public addresses whose number is extremely limited.

This over-consumption may be due to many factors, among them:
- the small proportion of logged-in clients (clients connected and using the service) as compared with the number of connected clients (clients who are subscribers to the service but have not activated it at an instant t).
- the gradual connecting-up of new clients.

Indeed, since each address pool can be linked to a service (for example an Internet access pool, a videoconferencing pool, a voice-on-IP pool etc), each of these pools must contain enough addresses to meet the needs of all the clients who have subscribed to services. For example, if 2000 clients have subscribed to the Internet access service, the pool in charge of this interface must contain at least 2000 addresses. This is so even if only a few clients (for example 200 clients) can be logged in simultaneously to the service at a given point in time. In this example therefore there is a very substantial level of unnecessary consumption of addresses.

As for the gradual connection of new clients, the prior art technique also raises problems since it necessitates the manual re-definition of the sizes of the pools according to the arrival of the new clients or again according to subscription to new services by existing clients. Thus, if a 2001st client wishes to access the Internet access service, then the pool in charge of this interface must be configured so that it contains at least 2001 available addresses. This is especially so as additions to pools are done in increments big enough to prevent repetition of these operations. This reconfiguration (which is a manual operation) proves to be cumbersome in that it increases the client's waiting time before he can access the desired service.

To overcome these phenomena of over-consumption of IP addresses, a dynamic address allocation method is proposed in the document U.S. 2005/097223. However, this method of allocation is implemented in DHCP relays, making the assigning of the addresses relatively inefficient and complicated.

SUMMARY

An aspect of the disclosure relates to a method of management implemented in an entity for the managing of sets of IP addresses, that comprises:
- a step of reception of a query for allocation of an IP address to a client terminal;
- a step of selection, of a set of IP addresses within which to choose said IP addresses to be allocated from among:
  - either at least one first existing set of IP addresses;
  - or at least one second set of IP addresses that is newly created as a function of at least one predetermined parameter,
- a step of transmission, to a DHCP relay able to allocate said IP address to said client terminal, of a piece of information for identifying said selected set of IP addresses.

Thus, an embodiment of the invention proposes a novel and inventive approach to the allocation of addresses. Indeed, the allocation request is propagated to an entity acting as a management centre for IP address pools. This management entity inspects one or more first sets of IP addresses liable to contain an address that may be available for the client who has asked for it. If this first set or these first sets of addresses do not comply with certain management parameters and therefore do not therefore the assigning of an address, then the entity is able to:
- create a new set in which the client can be served;
- and select it as a new default set.

An embodiment of the invention therefore enables the creation inter alia of pools of IP addresses on the fly without any need for a manual definition of the ranges of addresses in these particular pools.

It will be noted that the creation of a new pool of addresses is not necessarily conditional on the absence of IP addresses available in the already existing pools but can be done by anticipation.

Indeed, preferably, said at least one predetermined parameter is a piece of information representing a rate of filling of said first set of IP addresses.

This filling rate indication is used to determine whether a set can meet an allocation request from a client. The filling rate measures, for example, the number of IP addresses already allocated in a set. If this number exceeds a determined figure which, for example, can be set as a percentage of the number of addresses available in the pool when it was created, then the management entity can decide to create a new set of addresses to meet the client's request or by anticipation of a future request by a client.

Advantageously, the information on identification of the selected set of IP addresses is transmitted to the DHCP relay in using a specific field in a DHCP message. The information on identification of the selected set of IP addresses can also be transmitted by another means, such as a specific communications protocol.

Thus, the management entity is able to report its selection to the DHCP relay so that this relay can choose an IP address for its client in the selected set. This piece of identification information can travel through a DHCP server in the form of a DHCP message containing a specific field. This message may be the response to the allocation request transmitted by the DHCP relay. The identification information is therefore known to the DHCP server which transmits the DHCP message to the relay.

Preferably, the DHCP server uses said piece of information for identifying said selected set of IP addresses to administer said selected set of IP addresses.

Thus, the pool newly created by the management entity is taken charge of by a DHCP server and can be used in the same way as any other already created set of IP addresses.

In one embodiment of the In an embodiment of the invention, said entity for managing the sets of IP addresses is a DHCP server.

In this way, the DHCP server is able to build a set of IP address pools by itself without external intervention. The DHCP server can therefore always meet allocation requests that are sent and can propagate the creation of the pools of IP addresses that it creates.

In another embodiment, the entity for managing sets of IP addresses can also be common to several DHCP servers.

An embodiment of the invention also pertains to the entities for managing the sets of IP addresses implementing the above-described method. Advantageously, such entities have:
  means of reception of a query for allocation of an IP address to a client terminal;
  means of creating at least one set of IP addresses
  means of selecting a set of IP addresses within which to choose said IP address to be allocated from among:
    either at least one first set of existing IP addresses;
    or at least one second set of IP addresses that is newly created as a function of at least one predetermined parameter, These means enable these entities to perform an optimized management of the pools of IP addresses for which they are responsible without there being any excess consumption of IP addresses during the subscription for services by the client and without it's being necessary to reconfigure the sets of addresses at each connection of new clients.

An embodiment of the invention also pertains to a method of allocation of an IP address, by a DHCP relay, to a client terminal, that comprises:
  a step of reception of a piece of information for identifying a selected set of IP addresses from among:
    either at least one first existing set of IP addresses;
    or at least one second set of IP addresses newly created as a function of at least one predetermined parameter, and
  a step of allocation to said client terminal of an IP address chosen in said selected set of IP addresses.

Advantageously, said DHCP relay announces said selected set of IP addresses to at least one apparatus of said communication network, through routing protocols, when said selected set of IP addresses is newly created.

The consequence of this announcement is that the new addresses are taken into account in the routing tables of the router apparatuses of the network participating in the routing of the traffic addressed to the concerned clients and therefore ensures the efficient operation of the routing to these clients in the network.

An embodiment of the invention also pertains to DHCP relays comprising means of allocation of at least one IP address to a client terminal.

According to an embodiment of the invention, such relays comprise means of reception of a piece of information for identifying a selected set of IP addresses among:
  either at least one first existing set of IP addresses;
  or at least one second set of IP addresses newly created as a function of at least one predetermined parameter
and said means of allocation are able to choose said IP address to be allocated within said selected set of IP addresses identified by said piece of identification information received.

Thus, such relays are able to receive the information sent by the entities for managing the sets of IP addresses. In one embodiment of the invention, such relays are furthermore capable of interpreting the piece of information on identification of said set of IP addresses selected by said management entity in taking account of the specific field contained in a DHCP message.

An embodiment of the invention also relates to computer programs comprising program code instructions for the implementation of the steps of the management method and of the allocation method described here above.

BRIEF DESCRIPTION OF THE DRAWINGS

Other features and advantages of embodiments of the invention shall appear from the following description of a preferred embodiment, given by way of a simple and non-exhaustive example and from the appended drawings, of which.

DETAILED DESCRIPTION OF ILLUSTRATIVE EMBODIMENTS

Figure 1:
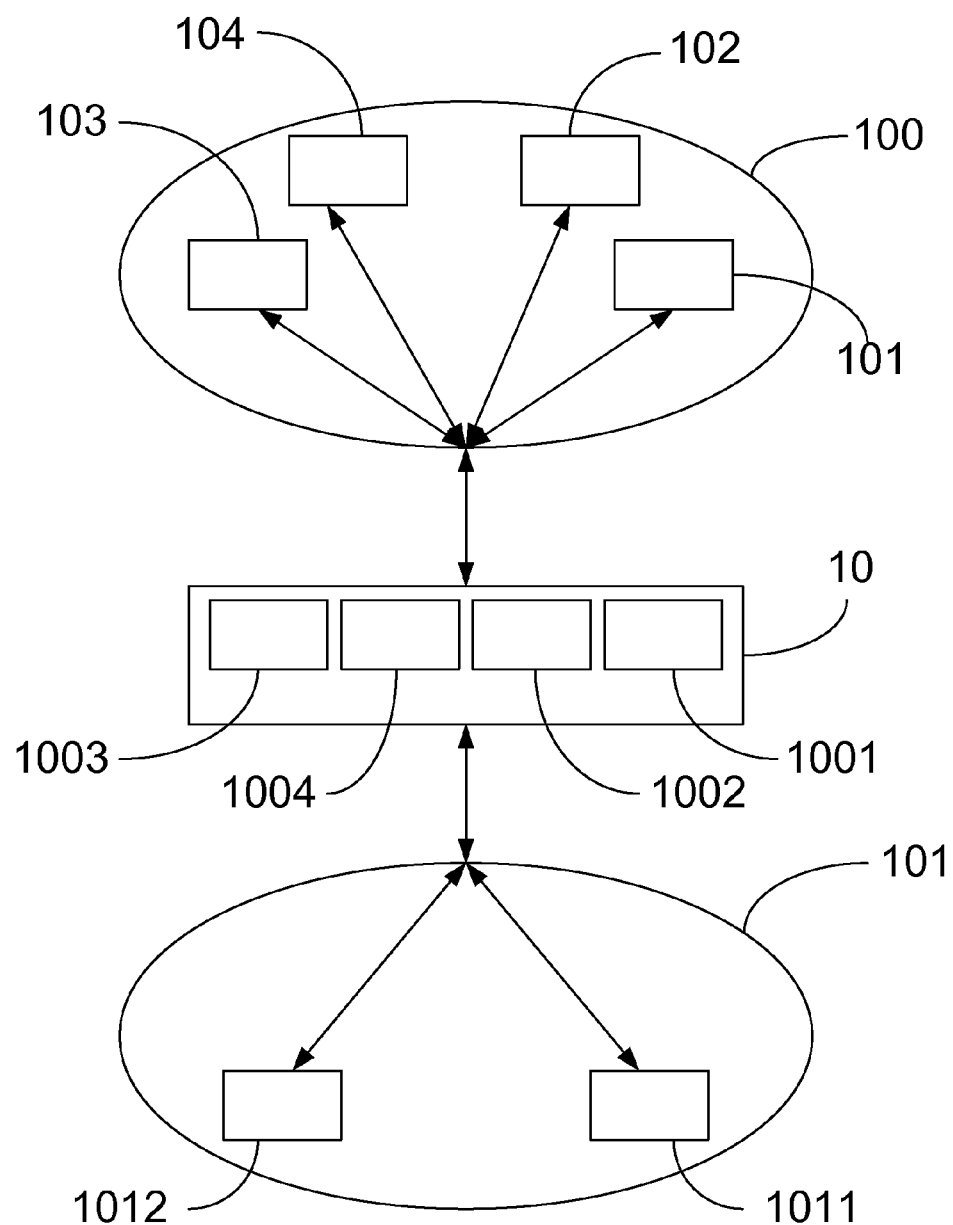
FIG. 1, already commented upon, is a diagram showing the principle of operation of a DHCP relay within a communications network of an operator.

Reminder of the Principle of an Embodiment of the Invention

In the context of an embodiment of the present invention, the description thus focuses on the dynamic allocation of sets of IP addresses (or IP address pools) in using the DHCP protocol.

An embodiment of the invention therefore proposes to integrate a dynamic dimension into the assigning of pools by DHCP. This new dimension in the assigning of pools enables an economy of addresses in matching the address pools to the best possible extent as a function of the addresses really consumed. Thus, for each service rendered, there is no longer one pool but several IP address pools in which the clients will be assigned addresses.

This new dimension is provided in:
  Detecting a (configurable) threshold for the filling of the pool;
  Creating a new pool if need be;
  Informing the relay apparatus (the DHCP relay) about the new attachment pool (something that the prior art does not allow since each address pool is statically attached to a "giaddr" address).

This dynamic assignment of the sets of IP addresses makes it possible to eliminate the static attachment of an interface in the DHCP relay equipment and makes it possible to take account of constraints of occupation of the pools.

Consequently, it is the relay apparatus that associates the IP configuration of the interface with the corresponding IP subnet.

In other words, the relay apparatus uses the value of "giaddr" for the choice of the pool only in the first phase. The DHCP server (or the management entity common to several DHCP services) first of all uses "giaddr" to assess the pool to which it is referring. Thereafter, if the pool reaches a certain filling rate, the DHCP server sends the relay (for example in the link-selection suboption of the DHCP message) the new pool to be used.

The DHCP relay apparatus is then capable of dynamically associating the client's attachment interface with an IP subnet and, if this IP subnet is not yet used, it is in a position to announce it to other apparatuses of the network through dynamic routing protocols such RIP, BGP, etc.

In a complementary embodiment of the invention, the decision to create a new pool is not linked solely to the pool filling rate. For reasons of performance, the decision to create a new pool can also be subordinated to a time slot (for example, a time slot in which it is known that the requests for assignment are numerous) and thus anticipate future requests for allocation.

Here below, we present especially the case of a DHCP server playing the role of a dynamic provider of IP address pools as well as a management entity federating the management of the sets of addresses on behalf of several DHCP servers. It is clear however that the invention is not limited to this particular application but can also be implemented in many other fields, for example in the world of telecommunications, when a radio communications terminal wishes to access digital broadcasting services of a telecommunications operator and when this access necessitates the dynamic assignment of an network level address and more generally in all cases when the goals listed in this document are of interest.

Description of One Embodiment

DHCP Server that is a Dynamic Provider of IP Address Pools

Figure 2:
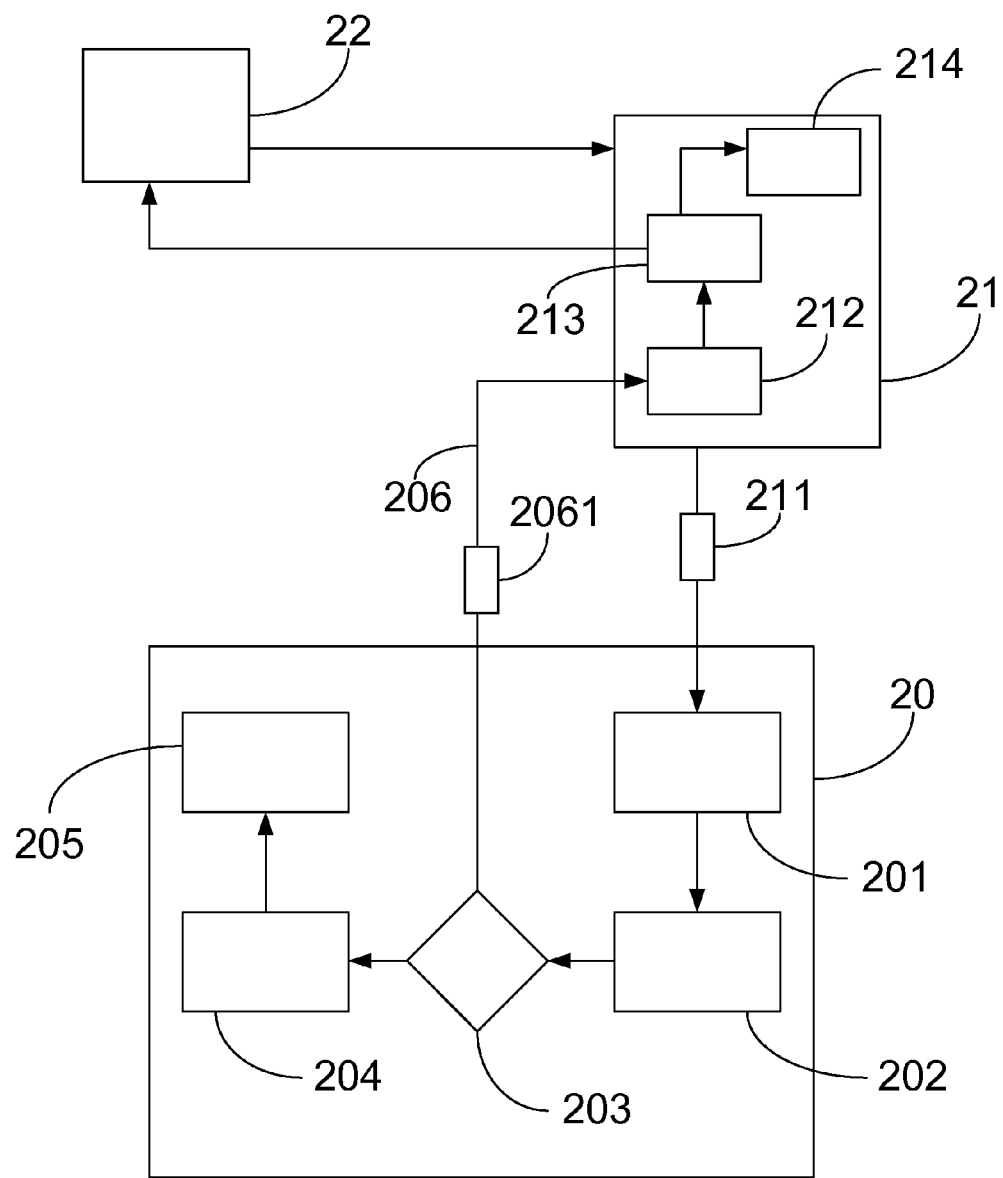
FIG. 2 illustrates the process of creation and dynamic assignment within a DHCP server.

Referring to FIG. 2, a simplified illustration is presented of a DHCP server having capacities of dynamically providing sets of IP addresses and responding to an IP address assignment query.

The DHCP server 20 receives an assignment query from a client 22. This query is relayed by a DHCP relay 21. In inspecting the value of the "giaddr" field 211 given by the DHCP relay 21, the DHCP server 20:

Identifies (201) the initial pool to which the DHCP relay 21 is attached;
Determines (202) the filling rate of this pool;
Creates (204) a new set of IP addresses if (203) the filling rate is greater than a maximum predetermined threshold;
Takes charge (205) of this newly created pool;
Forms a response 206 to the relay apparatus in signifying (2061) the pool to be used. In one particular embodiment, this signaling can be done by means of a protocol used to control the relay apparatus. In another embodiment, it is also possible to use the pool existing in a DHCP response (for example "link-selection suboption").

The relay DHCP 21:
Receives (212) the response from the DHCP server 20;
Proceeds (213) to attach the client to the pool indicated by the server 20;
Makes an announcement (214) to the apparatuses of the network about the pool (if it is a new pool) to be used by means of a routing protocol (RIP, BGP, IS-IS).

In this embodiment, the DHCP server 20 is used both for the administration of the address pools and to create new pools for the use of the different subnets.

Figure 4:
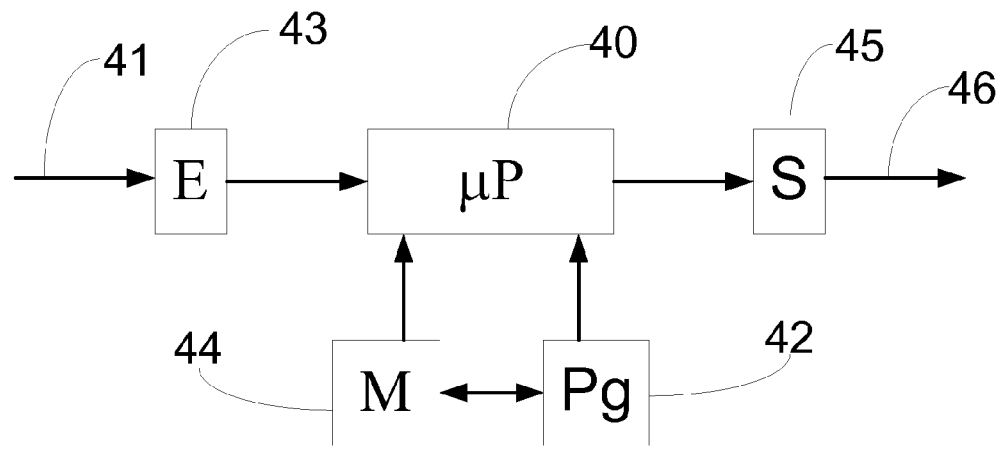
FIG. 4 provides a schematic illustration of the hardware structure of the DHCP server.

The structure of the server is illustrated schematically in FIG. 4. It has a memory M 41 and a processing unit 40 equipped with a microprocessor µP which is driven by a computer program (or application) µg 42. The processing unit 40 receives client queries and/or responses 44 at input through a network input interface module E43. The microprocessor µP processes these queries and/or responses according to the instructions of the program Pg 42 to generate commands and/or responses 46 which are transmitted through the network output interface module S 45.

In an alternative embodiment, it is possible to have available several DHCP servers within the network of the operator and configure these services so that they address sets of address pools linked to certain services. In this case, the network of the operator will have one DHCP server per service to supply to the client. Each of these DHCP servers is then capable of dynamically administering several sets of IP addresses linked to only one service.

Entity for the Federative Management of IP Address Sets

Figure 3:
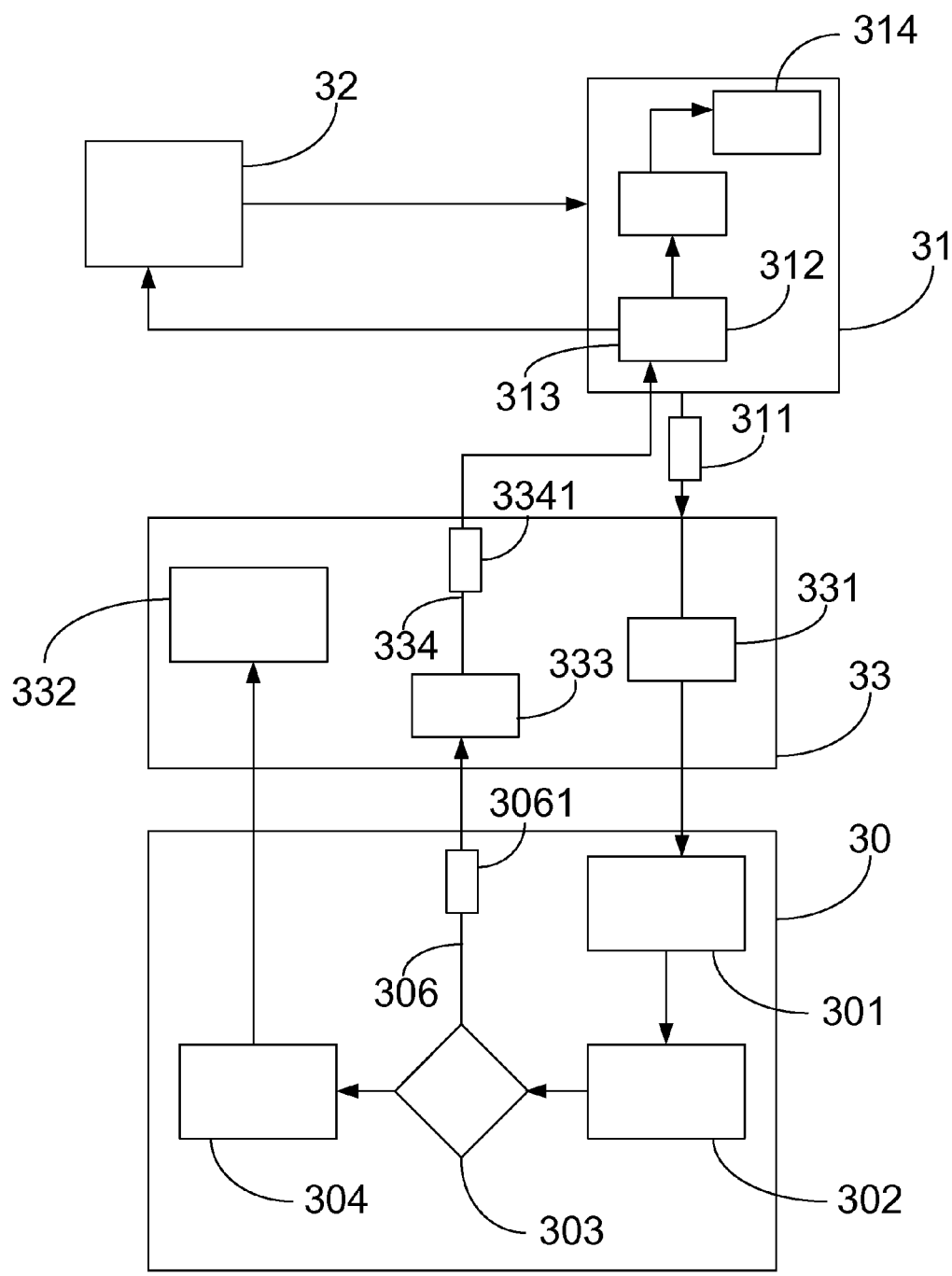
FIG. 3 describes the process of creation and dynamic assignment in relation with an entity for managing IP addresses.

Referring to FIG. 3, a simplified illustration is given of an entity for managing IP address sets on behalf of several DHCP servers.

The DHCP server 33 receives an allocation request from a client 32. This request is relayed by a DHCP relay 31. The DHCP server 33:

Transmits (331) the allocation request to the pool management entity 30 by means of a specific communication protocol;
In inspecting the value of the field "giaddr" 311 given by the DHCP relay 31, the pool management entity 30:
Identifies (301) the initial pool to which the DHCP relay 31 is attached;
Determines (302) the filling rate of this pool;
Creates (304) a new set of IP addresses if the filling rate (303) is greater than a predetermined threshold (for example the pool is used at more than 80%);
Forms a response 306 to the DHCP server 33 in signifying (3061) the pool to be used.
The DHCP server 33:
Takes charge (332) of the newly created pools;
Forms (333) a response (334) to the relay equipment 31 in signifying (3341 the pool to be used.
The DHCP relay 31:
Receives (312) the response from the server 33;
Proceeds (313) to attach the client 32 to the pool indicated by the server 33;
Makes an announcement (314) to the apparatuses of the network concerning the pool to be used (if it is a new pool) by means of a routing protocol (RIP, BGP, IS-IS, etc).

In this particular embodiment, the DHCP server does not directly govern the pools but communicates with an entity which manages the pools, namely an entity common to the DHCP servers. The role of the entity is to manage a set of pools common to all the DHCP servers and distribute them as and when needed to the different servers. This entity can be regionalized or centralized as a function of the operator's needs.

Figure 5:
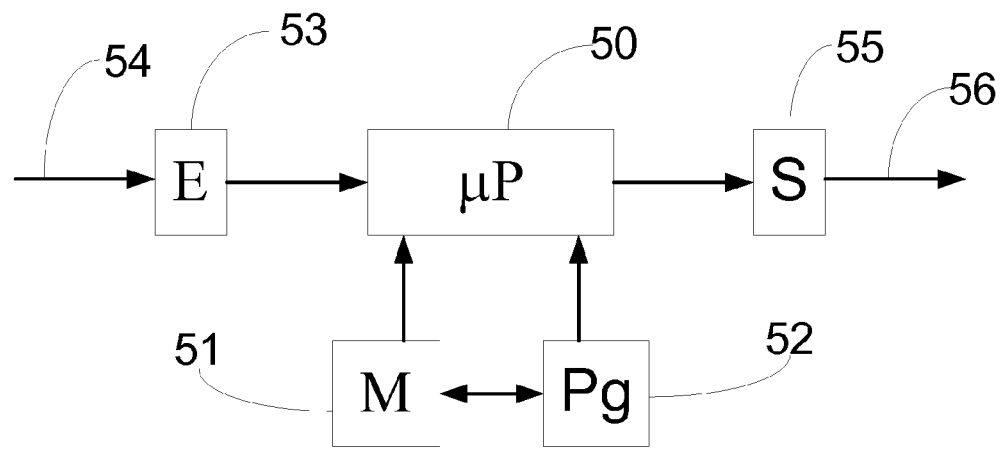
FIG. 5 is a schematic illustration of the hardware structure of a management entity independent of the DHCP server.

The structure of the server is illustrated schematically in FIG. 5. It has a memory M 51 and a processing unit 50 equipped with a microprocessor μP which is driven by a computer program (or application) Pg 52. The processing unit 50 receives client queries and/or responses 54 at input through a network input interface module E53. The microprocessor μP processes these queries and/or responses according to the instructions of the program Pg 52 to generate commands and/or responses 56 which are transmitted through the network output interface module S 55.

It is also possible, in one alternative embodiment, that an entity will deal with only one certain type of interface (or service). The network would then process several management entities, each responsible for the administration of a subnet; one entity for access to the Internet services, one entity for access to videoconferencing, etc.

Other Features and Advantages/Other Aspects

Example of Implementation

In a particular embodiment of the invention, the DHCP server integrates a main module. This main module works in clients/server mode and communicates with a client module implanted within the DHCP relay equipment.

The main server module is used to signify the DHCP pool to be used to the DHCP relay equipment.

This command may be made in the DHCP protocol by means of an existing DHCP option or by means of another protocol.

The main client module using information given by the main server module is then capable of dynamically associating (in the relay apparatus) the interface attaching the client to a IP subnet (linked to the pool that has been decided beforehand) and, if this IP subnet is not yet being used, to announce it to the network by means of dynamic routing protocols such as RIP, BGP, etc.

The management entity proper is implanted, according to its configuration, respectively in the DHCP server (which directly manages the pools) or in an entity managing the pools and communicating with the DHCP servers so as to provide pools to the DHCP servers dynamically and as a function of needs. The entity then takes the form of a secondary module (decision-making module).

The decision-making module manages the pools and sees to the optimizing of their use as a function of configurable criteria (criteria capable of being administrated) such as thresholds of use When the decision-making module decides to use a new pool, the main module is activated in the DHCP server concerned.

The Case of Substitution of the Relay Equipment

In the process of access to a service for a client of an operator or an Internet service provider, it may happen that a preliminary authentication step takes place before the acquisition of an IP address by the DHCP protocol. This step consists in verifying the rights of use of the client by means of protocols such as RADIUS or TACACS. This case may occur for example within a DSLAM initiating a phase of authentication from a viewpoint of the 802.1X protocol (the authentication is then done on the basis of the physical parameters of the client's line, for example the telephone line in the case of xDSL).

In a particular embodiment of the invention, the use of a new pool could be decided during this preliminary authentication step. In this case, it is no longer the relay equipment that addresses the query concerning choice of pool to the pool management entity but the apparatus in charge of the authentication. The management entity or DHCP server determines the pool to be used or creates a new pool as need be.

The apparatus in charge of the authentication transmits this information to the relay apparatus but keeps the memory of this information (namely the attachment pool) in order to use it during the DHCP step without having to call the DHCP server or the management entity again.

During the DHCP process, the relay apparatus indicates the pool to be used in the DHCP message (using the giaddr field or the link-selection suboption or other means).

An embodiment of the invention provides a technique for the assigning of IP address pools that is dynamic and free of the constraints related to the value of the "giaddr" field.

An embodiment of the invention ensures optimal matching between the number of IP addresses available in a set of addresses and the number of clients logged in and needing an address in one of these sets.

An embodiment of the invention provides a technique in which the content of the sets of IP addresses do not have to be redefined when a new client subscribes to a service and which averts the drawbacks of conventional systems using a manual redefinition of the IP address pools for the connection of new clients.

Thus an embodiment of the invention proposes a technique for the allocation of IP addresses to a client that is simpler and more open-ended than in the prior art.

Although the present disclosure has been described with reference to one or more examples, workers skilled in the art will recognize that changes may be made in form and detail without departing from the scope of the disclosure and/or the appended claims.

The invention claimed is:

1. A method of management implemented in a server apparatus for managing sets of IP addresses, wherein the method comprises:
receiving, in said server apparatus, a query for allocation of an IP address to a client terminal from a DHCP relay processing apparatus, said DHCP relay processing apparatus being distinct from said server apparatus;
identifying a first existing set of IP addresses from the received query for allocation;
determining a filling rate of said first set of IP addresses;
newly creating a second set of IP addresses as a function of at least one predetermined parameter linked to said filling rate; and
transmitting, to the DHCP relay processing apparatus, a piece of information identifying said newly created second set of IP addresses, within which the DHCP relay processing apparatus has to choose said IP address to be allocated to said client terminal.

2. The method of management according to claim 1, wherein said at least one predetermined parameter comprises a piece of information representing the filling rate of said first set of IP addresses.

3. The method of management according to claim 1, wherein said information on identification of said second set of IP addresses is transmitted to said DHCP relay processing apparatus in using a specific field in a DHCP message.

4. The method of management according to claim 1, wherein said server apparatus for managing the sets of IP addresses comprises a DHCP server.

5. A server apparatus for managing sets of IP addresses, capable of communicating with at least one DHCP relay apparatus, wherein the server apparatus comprises:
- means for reception of a query for allocation of an IP address to a client terminal;
- means for identifying a first existing set of IP addresses from the received query for allocation;
- means for determining a filling rate of said first set of IP addresses;
- means for newly creating a second set of IP addresses as a function of at least one predetermined parameter linked to said filling rate; and
- means for transmitting, to the DHCP relay processing apparatus a piece of information for identifying said newly created second set of IP addresses, within which the DHCP relay processing apparatus has to choose said IP address to be allocated to said client terminal.

6. A method of allocation of an IP address, by a DHCP relay processing apparatus, to a client terminal, wherein the method comprises:
- sending to a server apparatus a query for allocation of an IP address to a client terminal, said DHCP relay processing apparatus being distinct from said server apparatus, said query of allocation identifying a first existing set of IP addresses;
- receiving a piece of information for identifying a newly created second set of IP addresses, when a previously determined filing rate of the first set of IP addresses has led to creation by said server apparatus of said second set of IP addresses as a function of at least one predetermined parameter linked to said filling rate;
- allocating to said client terminal an IP address chosen in said newly created second set of IP addresses by said DHCP relay apparatus; and
- attaching said client terminal to said newly created second set of IP addresses.

7. The method of allocation according to claim 6, wherein said DHCP relay apparatus announces said selected set of IP addresses to at least one apparatus of a communication network, through at least one routing protocol, when said selected set of IP addresses is newly created.

8. A DHCP relay processing apparatus comprising:
- means for sending to a server apparatus a query for allocation of an IP address to a client terminal, said DHCP relay processing apparatus being distinct from said server apparatus, said query of allocation identifying a first existing set of IP addresses;
- means for receiving a piece of information for identifying a newly created second set of IP addresses, when a previously determined filing rate of a first set of IP addresses has led to creation of said second set of IP addresses as a function of at least one predetermined parameter linked to said filling rate;
- means for allocating to said client terminal an IP address chosen in said newly created second set of IP addresses; and
- means for attaching said client terminal to said newly created send set of IP addresses.

9. A non-transitory computer readable medium containing computer program stored therein for causing a computer processor to perform a method of managing sets of IP addresses, when the instructions are executed by a computer, wherein the method comprises:
- receiving a query for allocation of an IP address to a client terminal;
- identifying a first existing set of IP addresses from the received query for allocation;
- determining a filling rate of said first set of IP addresses;
- newly creating a second set of IP addresses as a function of at least one predetermined parameter linked to said filling rate; and
- transmitting, to a DHCP relay apparatus that is able to allocate said IP address to said client terminal, a piece of information identifying said created second set of IP addresses, within which the DHCP relay processing apparatus has to choose said IP address to be allocated to said client terminal.

10. A non-transitory computer readable medium containing computer program stored therein for causing a computer processor to perform a method of allocating an IP address, by a DHCP relay apparatus, to a client terminal, when the instructions are executed by a computer, wherein the method comprises:
- a step of sending to a server apparatus a query for allocation of an IP address to a client terminal, said DHCP relay processing apparatus being distinct from said server apparatus, said query of allocation identifying a first existing set of IP addresses;
- a step of reception of a piece of information for identifying a newly created second set of IP addresses, when a previously determined filing rate of a first set of IP addresses has led to creation of said second set of IP addresses as a function of at least one predetermined parameter linked to said filling rate;
- a step of allocation to said client terminal of an IP address chosen in said newly created second set of IP addresses, and
- a step of attaching said client terminal to said newly created send set of IP addresses.

* * * * *